United States Patent [19]

Namba et al.

[11] Patent Number: 5,783,932

[45] Date of Patent: Jul. 21, 1998

[54] POWER GENERATION PLANT AND CONTROL APPARATUS THEREFOR

[75] Inventors: Shigeaki Namba; Kengo Uda, both of Hitachi, Japan

[73] Assignee: Hitachi, Ltd., Tokyo, Japan

[21] Appl. No.: 619,185

[22] Filed: Mar. 21, 1996

[30] Foreign Application Priority Data

Mar. 23, 1995 [JP] Japan ................................. 7-063701

[51] Int. Cl.$^6$ ..................................................... H02P 9/04
[52] U.S. Cl. ............................. 322/16; 290/47; 307/64
[58] Field of Search ............................ 322/16, 58, 28; 307/105, 64; 290/13, 47

[56] References Cited

U.S. PATENT DOCUMENTS

| | | | |
|---|---|---|---|
| 4,119,861 | 10/1978 | Gocho | 290/13 |
| 4,403,292 | 9/1983 | Ejzak et al. | 364/492 |
| 4,967,096 | 10/1990 | Diemer et al. | 307/38 R |
| 5,559,421 | 9/1996 | Miyakawa | 322/58 |

FOREIGN PATENT DOCUMENTS 4-54227  2/1992  Japan .

*Primary Examiner*—Thomas M. Dougherty
*Assistant Examiner*—Nicholas Ponomarenko
*Attorney, Agent, or Firm*—Fay, Sharpe, Beall, Fagan, Minnich & McKee

[57] ABSTRACT

The object of the invention is to provide an electric power plant and a control apparatus therefor which can obtain an emergency power supply reliably through use of the turbine starter. Another generator different from the main generator coupled to the rotor shaft of the turbine is provided to the input side of the starter via a motor, and a control apparatus is provided for electrically connecting the starter and the generators responsive to a bus voltage from the in-house power supply unit which supplies electricity to a plurality of auxiliary equipment operating in the electric power plant. Thereby, an emergency power supply can be obtained reliably by the simple configuration of the invention without installing emergency power generation facilities such as a diesel engine, gas turbine or the like. In addition, an LCI device which has been utilized only at the time of turbine start up can be utilized advantageously also at the time of emergency when the in-house power supply is lost.

11 Claims, 3 Drawing Sheets

5,783,932

POWER GENERATION PLANT AND CONTROL APPARATUS THEREFOR

BACKGROUND OF THE INVENTION

1. Field of the Invention

This invention relates to a power generation plant and a control apparatus for controlling the power generation plant having a synchronous generator coupled to a steam turbine or gas turbine, and a starter for starting the steam turbine or gas turbine by supplying electricity to the synchronous generator which can be used as a motor-generator.

2. Related Art

In a power generation plant, and, in particular, in a combined cycle plant or gas turbine simple cycle plant, a gas turbine is started by use of a so-called thyristor starter such as a load commutated inverter (LCI) or a static-frequency converters (SFC). This starter is provided to be connected via a circuit breaker or disconnecting switch to a synchronous generator which is coupled to the gas turbine thereby to be able to supply an AC current having an arbitrary frequency, converted from a power supply from an electric power distribution system or from an in-house or in-station power supply, to the synchronous generator which is then driven as a synchronous motor. The start up operation by this starter is continued until the gas turbine is self-sustainable of its speed on its combustion energy. Thereafter, the synchronous generator and the starter are isolated through opening of the circuit breaker or disconnecting switch. Such a power plant and its arrangement is disclosed, for example, in JP-A No. 4-54227.

Generally, normal power generation plants are provided with an AC emergency power supply unit. This emergency power supply unit will operate when a house or station power supply unit installed in the power plant to supply power to auxiliary equipment fails due to some abnormality so as to substitute for the failed house power supply unit and supply power to a part of such auxiliary equipment. As such emergency power supply units, there is one in which a prime mover of a diesel engine combusting heavy oil as fuel drives an AC generator, and another one in which a gas turbine generator combusting gas as fuel supplied from a gas pipeline is used. All of these units are adapted to be able to start without supply of electricity from the power system.

Any of the emergency power supply units described above entails a risk that it may not start at once because it is stand-by equipment which has not been operated for a long time and is forced to start up instantly. Rotational energy or torque of the rotating shaft obtained in the course of supplying raw fuel to combustion thereof, is then converted to electrical energy. Therefore, in any one of the steps in the above course a trouble may arise, such as an ignition instability in combustion, and a reliability in starting of reciprocating movement of pistons in the case of diesel engine.

SUMMARY OF THE INVENTION

The present invention proposes a novel emergency power supply system which can replace the conventional emergency power supply system. The main object of the invention is to provide a power generation plant and control apparatus therefor which is capable of supplying a highly reliable emergency power supply through use of a turbine starter according to the invention.

In order to accomplish the above-mentioned object, a power generation plant according to the invention having a generator coupled to the rotor shaft of the turbine, and a starter coupled via a circuit breaker or disconnecting switch to the generator, which starter is adapted to supply power to the generator when starting up the turbine, is characterized by comprising another generator provided via a motor on the power input side of the starter in addition to the generator coupled to the rotor shaft of the turbine, and a control unit which executes a switching operation to close and open the circuit breaker or disconnecting switch in response to a bus voltage of the house power supply which supplies electric power to operate a plurality of auxiliary equipment installed within the plant.

The control unit described above is arranged to close the circuit breaker or disconnecting switch when an output voltage from the in-house or in-station power supply unit drops.

Further, the power generation plant according to another aspect of the invention is comprised of a first generator coupled to the rotor shaft of a turbine, a starter which is connected to the turbine generator via a circuit breaker or disconnecting switch to supply electric power to the generator when starting up the turbine, a motor which is provided on the current input side of the starter, a second generator coupled to the motor, and a control unit which causes the circuit breaker or disconnecting switch to close when the bus voltage of the in-house power supply drops, for supplying, instead thereof, electric power to operate a plurality of auxiliary equipment within the power generation plant, wherein upon stop of operation of the plurality of auxiliary equipment due to the drop of bus voltage maintained by the in-house power supply, the motor is driven via the starter utilizing an inertial force of the turbine rotor persisting after the stop of operation of the auxiliary equipment so that the second generator produces electricity.

Further, the control unit provided for controlling the power generation plant having the generator coupled to the rotor shaft of the turbine, and the starter connected via the circuit breaker or disconnecting switch to the generator for starting the turbine by supplying electric power to the generator, is characterized by comprising means for closing the circuit breaker or disconnecting switch when the bus voltage maintained by the in-house or in-station power supply unit drops which supplies power to a plurality of auxiliary equipment installed within the plant, whereby upon stoppage of operation of the plurality of auxiliary equipment due to the drop of the power supply voltage maintained by the in-house power supply, the motor connected to the input side of the starter is driven using the rotational energy of inertia of the turbine.

In an arrangement having a generator coupled to the rotor shaft of a turbine, a first circuit breaker through which electricity generated by the generator is supplied to a power transmission system, and a starter connected via a second circuit breaker to the generator for starting the turbine by supplying electricity to the generator which then functions as a motor-generator, the arrangement further comprises means for opening the first circuit breaker and closing the second circuit breaker when the power supply voltage of the in-house power supply drops which supplies electricity to the plurality of auxiliary equipment serving within the plant, whereby, upon stoppage of operation of the auxiliary equipment due to the drop of the power supply voltage from the in-house power supply, the motor connected to the starter on the input side thereof is urged to operate using the rotational energy of inertia of the turbine persisting after the stoppage of operation of the auxiliary equipment so that another generator connected to the motor produces electric power.

When the bus voltage from the in-house power supply drops suddenly due to occurrence of abnormality, there exists basically no energy available. Strictly-speaking, however, there exists an inertial energy available as a torque or mechanical energy persisting on the turbine shaft system. Assuming a capacity for the above-mentioned emergency power supply unit to be in the range of 1000 to 2000 kW, an inertial energy persisting on such a shaft system required for generating an electric power of several hundred thousands kW will suffice and enable initial starting and accelerating of the emergency power supply unit up to a range where a substantial number of revolutions is attained.

The present invention focuses on use of this rotational energy or torque due to inertia persisting on the rotor shaft of the turbine immediately after the occurrence of abnormality. Another generator different from the generator coupled to the rotor shaft of the turbine is connected via the motor to the turbine starter on the input side thereof, and when the bus voltage from the in-house power supply drops suddenly, the generator coupled to the turbine and the starter which is connectable to the generator via the circuit breaker or disconnecting switch are electrically connected by closing the circuit breaker or disconnecting switch, whereby the torque due to rotational energy persisting on the shaft system of the turbine can be transformed or regenerated as useful electrical energy by means of the another generator.

The invention described above will be further detailed in the following. When abnormality occurs in the in-house power supply unit, namely, when the bus voltage from the in-house power supply drops, fuel supply necessary to drive the turbine is interrupted due to stoppage of operation of a fuel supply pump, solenoid valve or the like. The gas turbine and the generator coupled thereto, however, continue their rotation due to rotational energy of inertia persisting on the gas turbine for about several tens of minutes even after shutdown of fuel supply. At this instant, if the circuit breaker or disconnecting switch is closed to electrically connect the generator and the starter, and also the motor on the input side of the starter, the rotational energy of inertia persisting on of the gas turbine shaft can be regenerated to drive the motor. Since this regenerated electric power is supplied to the motor through the starter which is a thyristor starter, an electric power having a frequency characteristic appropriate to the motor can be supplied. Then, by coupling the motor to the another generator, emergency electric power can be generated reliably in a simple arrangement of components according to the invention without a need to install an additional diesel engine, gas turbine engine or the like.

BRIEF DESCRIPTION OF THE DRAWINGS

These and other objects, features and advantages of the invention will become more apparent upon a reading of the following detailed description and drawing, in which.

PREFERRED EMBODIMENTS

Preferred embodiments of the invention will be described in detail with reference to the accompanying drawings.

Figure 1:
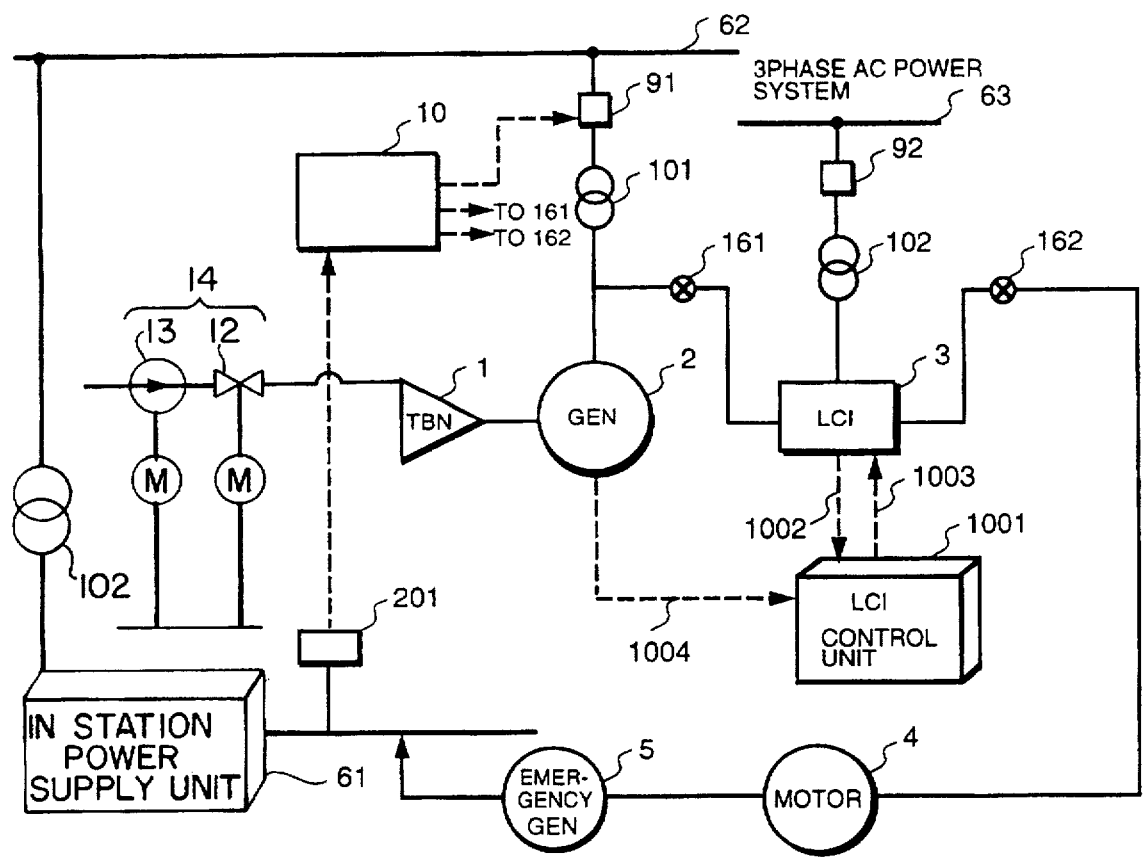
FIG. 1 is a schematic block diagram of a power generation plant of one embodiment of the invention.

FIG. 1 is a schematic block diagram indicative of an arrangement of a power plant of one embodiment according to the invention. In the drawing of FIG. 1, a generator 2 is coupled to a turbine 1 such as a gas turbine so as to convert mechanical energy of turbine 1 to electrical energy. The electric power thus obtained is supplied to power transmission system 62 via power transformer 101 and circuit breaker 91. When starting up turbine 1, a thyristor starter called as a load commutated inverter (LCI) or static-frequency converter (SFC) is utilized, which will be referred to as LCI unit 3 hereinafter. This LCI unit 3 receives an AC electrical power from power system 63 via circuit breaker 92 and power transformer 102, rectifies the AC power to DC power, then inverts the DC power into AC power having an arbitrary AC frequency to supply to the generator 2 via disconnecting switch 161. Then, the generator 2 is operated as a synchronous motor to provide a torque control necessary for the turbine 1 to start up the plant. For example, in the case of a gas turbine, when turbine 1 attains or exceeds a self-sustaining speed that it can maintain on its own combustion energy, the disconnecting switch 161 is opened to isolate LCI unit 3 from the generator 2 thereby to start a normal operation of power generation. At this instant, circuit breaker 92 is also opened to cut off power supply from power system 63.

Further, in the LCI unit 3 described above, a three-phase AC current from the power distribution system 63 with a commercial frequency is converted into a DC current by thyristor elements of the converter. Then, the DC current is inverted into an AC current having a frequency suitable for starting up generator 2 then serving as a motor, the number of revolutions of which is 0 or in the vicinity of 0, and having a current value corresponding to a start-up torque required. Generally, control operation over acceleration of the rotor shaft of the generator is executed through manipulation of a phase angle called a firing angle or control angle for the thyristor circuit in the LCI unit 3 LCI control device 1001 is provided for this purpose. The LCI control device 1001 receives electrical process quantity 1002 such as a current or the like which flows through the thyristor circuit, and electrical/mechanical process quantity 1004 such as of the number of revolutions of the rotor shaft of the generator, which is to be controlled, computes a current/torque value necessary to attain an appropriate speed rise pattern predefined in a given start-up schedule, then outputs the result of computation as control signal 1003 for use in manipulation of the target value to the phase angle described above. The control procedure described above is continued until the speeds of the turbine 1 and generator 2 reach a predetermined number of revolutions or the vicinity thereof.

In-house or in-station power supply unit (emergency AC bus) 61 receives electricity, for example 6000 V, 400 V or the like from an electric power system 62, 63 via a step-down transformer 10%, and supplies it to various auxiliary equipment which control the plant operation. This auxiliary equipment 14 includes, for example, a water feed pump, fuel supply pump 18, fuel control valve 12, air flow control valve and the like. Undervoltage relay 201 is actuated when the bus voltage from the in-house power supply unit 61 is detected to have dropped, for example, to about 30% of its normal output voltage due to abnormality due to lightning or failure of transformers. This actuating signal is used as various alarms.

One embodiment of the invention having the plant arrangement described above includes circuit breaker 162, motor 4 connected to the input side of LCI unit 3 via the circuit breaker 162, emergency generator 5 coupled to the motor 4, and control unit 10 added thereto which in response to a signal from undervoltage relay 201 produces a control signal to circuit breaker 91 and disconnecting switches 161, 162. Operation at the time of abnormality of in-house power supply unit 61 having the above-mentioned constitution will be described in the following.

Control unit 10 receives an actuation signal from undervoltage relay 201 detecting an occurrence of abnormality in the in-house power supply unit 61. In response to this actuation signal, the control unit opens circuit breaker 91 to isolate the generator 2 from the power system 62 and to release excitation of the generator 2. Then, circuit breaker 161 is closed electrically to connect LCI unit 3 with the generator 2, and, almost at the same time, excitation of the generator 2 is resumed then followed by closure of circuit breaker 162 which electrically connects the input side of LCI unit 3 with the motor 4. Through such steps of operation described above, rotational energy due to inertia persisting on the turbine rotor shaft at the time of and after occurrence of abnormality in the in-house power supply unit 61 can be extracted through generator 2, circuit breaker 161, LCI unit 3, disconnecting switch 162 and by motor 4. Thus, it becomes possible to regenerate the rotational energy of inertia of the turbine 1 as electrical energy by emergency generator 5 which is coupled to the motor 4 which is energized by the regenerated inertia. The regenerated electric power from the emergency generator 5 may be supplied to the auxiliary equipment 17 through the in-house power supply unit 61 or through a step-down transformer which steps down the regenerated power to an appropriate voltage.

The control feature according to the invention is realized essentially through a switchable modification of configuration of the current circuit due to close/open operation of circuit breaker 91 or disconnecting switches 161, 162, or through a combination thereof with the aforementioned LCI control unit 1001 which manipulates the phase angle to an appropriate position. The description of this embodiment of the invention has been made by way of example of the current circuit modification control through open/close operation of the circuit breaker and disconnecting switches. However, when the phase angle control by the LCI control unit is desired to be combined therewith, an arrangement for implementing a proper control of the phase angle by entering the number of revolutions of the motor 4 as well as a target value of power generation and the like into the LCI control unit may be added as will be exercised during the steady-state operation described above.

Figure 2:
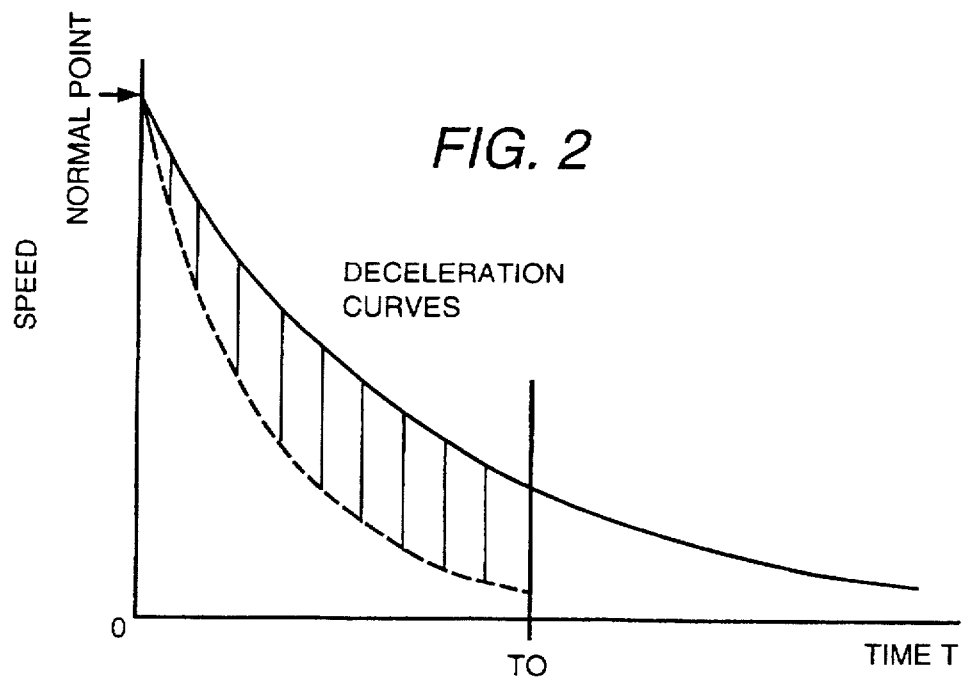
FIG. 2 is a schematic diagram indicating speed changes of the turbine when the embodiment of the invention is applied.

With reference to FIG. 2, there is described a speed drop curve for turbine 1 and transition of available energy when the embodiment of the invention is applied.

In the drawing of FIG. 2, the axis of ordinate represents speeds of turbine 1 and the axis of abscissa represents time T. Both the solid curve and dotted curve indicate changes of speed of turbine 1 with time after the occurrence of abnormality in the in-house power supply unit 61. The solid curve indicates a conventional drop mode of turbine speed with rather a slow drop gradient. However, when the embodiment of the invention is applied which regenerates the rotational energy due to inertia after the occurrence of abnormality in the in-house power supply unit, the turbine speed drops rapidly as indicated by the dotted curve due to regeneration braking acting on turbine 1. An area with hatching surrounded by the solid and dotted curves between T=0 which is the time of occurrence of abnormality and T=To which is a threshold turning speed of the turbine indicates a portion of energy available for regeneration, which can be utilized for driving motor 4. No description, however, will be given as to a difference in loss due to a difference between the numbers of revolutions of the generator and the motor.

As has been described above, an emergency power supply can be obtained by a simple circuit arrangement according to the invention without installing a diesel engine, gas turbine or the like which has been required conventionally. In addition, since it depends on a transfer of electrical energy itself, i.e., from one electrical energy to another electrical energy, a more reliable emergency power supply can be obtained. Any other modification of the invention such as a combination with a conventional emergency power supply should be construed within the scope of the invention. Further, an emergency power supply obtained by the invention may be utilized for starting up a conventional emergency power supply unit within the scope of the invention.

In addition, since LCI unit 3 which has been used conventionally only at the time of start up of the plant, can be utilized also at the time of abnormality of the in-house power supply unit 61, its availability is improved substantially, thus improving the cost performance of the plant.

Figure 3:
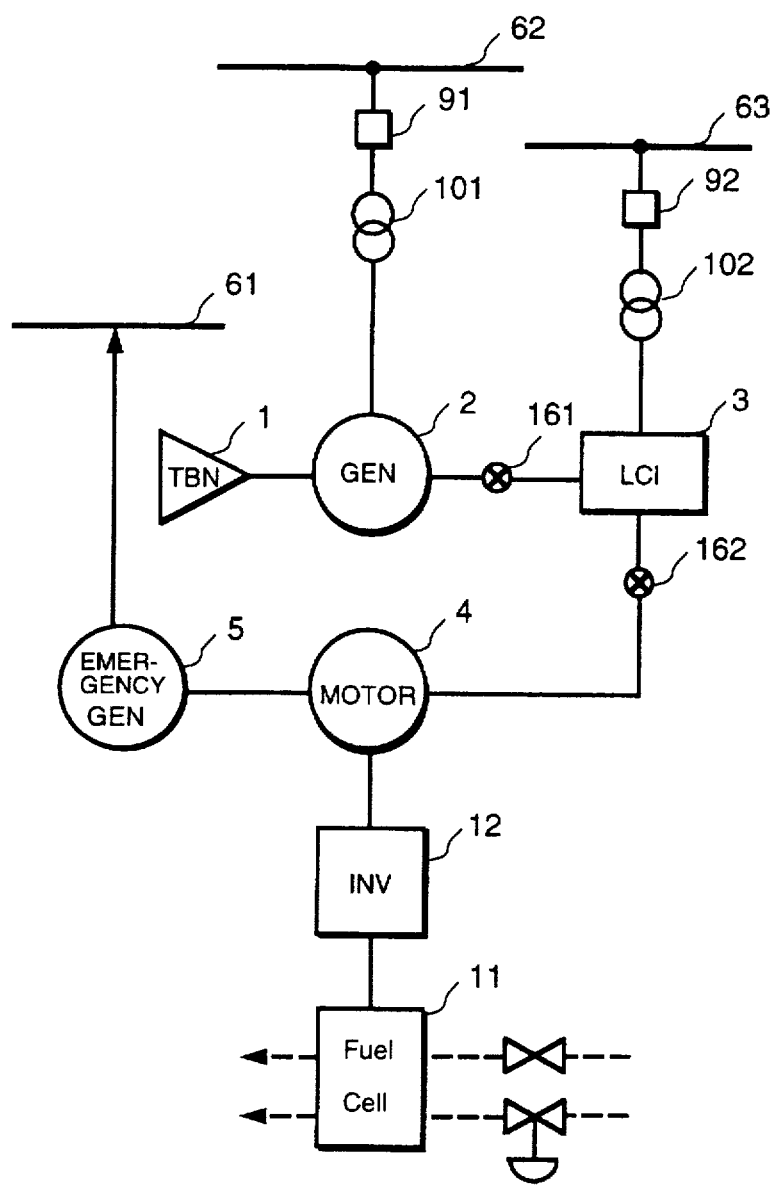
FIG. 3 is a schematic block diagram of another embodiment of the invention in which a fuel cell power generation plant is added to the power generation plant of FIG. 1.

With reference to FIG. 3, there will be described another embodiment of the invention in the following.

The embodiment of the invention described with reference to FIG. 3 basically has the same plant configuration of FIG. 1 and further includes a fuel cell power generation system 11 and an inverter unit 12. By way of example, the control unit 10 and LCI control unit 1001 are not shown in the drawing. As has been described with respect to the embodiment of FIG. 1, the present invention has been conceived to make use of the regenerative energy with the help of LCI unit 3 which utilizes the regenerated energy to drive the motor 4 which supplies start-up energy to emergency AC generator 5. However, since the regenerated energy from LCI unit 3 is not of the type of energy which is sustainable for long, fuel cell power generation system 11 is provided for use when the regenerated energy supplied from LCI unit 3 drops below a required energy level as an alternative energy source to drive the motor 4 so that emergency ac generator 5 continues its operation without interruption. More particularly, when the regenerated energy from LCI unit 3 drops below the required level, fuel cell power generation system 11 takes over LCI unit 3, which supplies power through inverter unit 12 to motor 4. By way of example, since electricity supplied from fuel cell power generation system 11 is a direct current, if motor 4 is an AC motor, the direct current must be inverted into an alternating current using inverter unit 12. On the other hand, if motor 4 is a DC motor, an AC current from LCI unit 3 must be converted into a direct current using inverter unit 12.

The fuel cell power generation system 11 is a typical DC current generation facility which produces a DC current through reverse reaction of electrolysis of water, which is supplied continuously with fuel of a hydrogen-rich gas obtained by reforming LNG or the like, and produces electricity through electro-chemical reaction. This fuel cell power generation system requires some pumps, fans and the like as its components. Capacities and quantities thereof are not substantial when viewed in a plant of a MW class.

Figure 4:
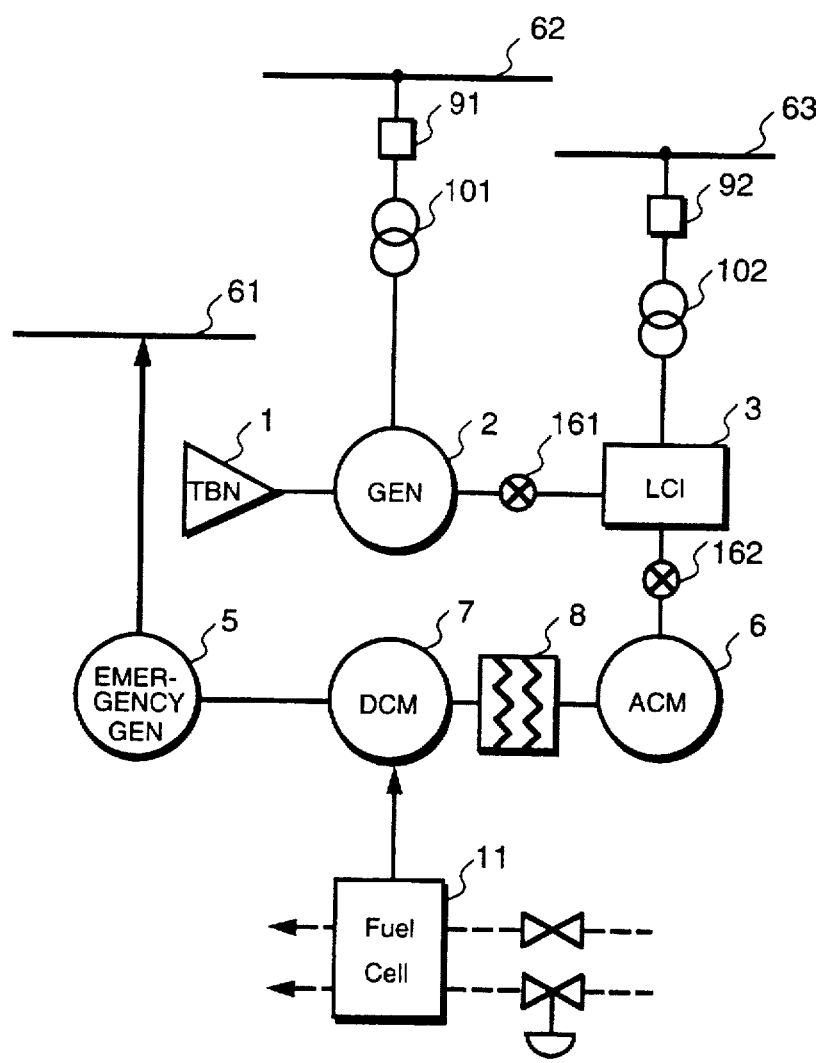
FIG. 4 is a schematic block diagram of still another embodiment of the invention.

Still another embodiment of the invention will be described with reference to FIG. 4.

This embodiment of the invention indicates a system in which switching of power supplies between LCI unit 3 and fuel cell system 11 is implemented mechanically. In the drawing of FIG. 4, there are provided AC motor 6 which is driven by AC power supplied from LCI unit 3 and DC motor 7 which is driven by DC power supplied from the fuel cell generation system 11, and clutch 8 which mechanically connects and disconnects the AC motor 6 and DC motor 7.

The principle of switching in the above arrangement will be described by way of example of a conventional gas turbine power generation facility.

As a conventional gas turbine generation facility, there is one in which a start up motor and a torque converter are adapted to supply a torque to the gas turbine to rotate its rotor shaft, and when its rotor speed reaches or exceeds a level of rotation enough for a self-sustaining torque to be ensured after ignition of the combustor of the gas turbine, the torque converter is released of its mechanical coupling as having done its task of torque transfer at the instant the torque generated becomes greater than the torque transferred. This is a sort of mechanical clutch. Further, there is another one in which through a specific design of a clutch coupling shape for a portion in mesh, its torque transfer side after having done its task is repelled to decouple mechanically. Either one of the arrangements described above has a proven performance as a mechanical decoupling mechanism. Therefore, in this embodiment of the invention, either one of the above-mentioned mechanism is applied to clutch 8 to switch from the AC motor 6 to the DC motor 7. Namely, AC motor 6 is driven by LCI unit 3 the torque of which, however, decreases with time, therefore, at the time when the torque becomes smaller than a torque to be given by DC motor 7 which is driven by electric power supplied from fuel cell system 11, the clutch 8 mechanically coupling AC motor 6 and DC motor 7 is decoupled to replace AC motor 6 by DC motor 7 for driving emergency generator 5 continuously.

The arrangement of this embodiment of the invention which applied and modified the known and proven mechanism has enabled a fast and easy switching between drive sources for emergency generator 5. Further, any power supply other than the fuel cell power generation system may also be used as a power source for the DC motor.

There are such advantages to be implemented according to the invention as follows. A reliable emergency power supply can be provided by a simple configuration without installing an emergency power supply facility which conventionally uses a diesel engine, gas turbine engine or the like. Further, the LCI unit which is operated only during the start-up of the plant can be utilized also at the time of abnormality such as when a loss of power occurs in the in-house power supply unit. Still further, by use of the LCI unit in the stop operation of the turbine, the turbine speed can be decelerated more rapidly to its turning speed.

We claim:

1. In a power generation plant having a turbine, a first generator coupled to a rotor shaft of said turbine, a starter device connected to said first generator via a disconnecting switch for outputting a power by converting the frequency of an input electric power, auxiliary equipment for assisting operation of said turbine, and an in-station power supply unit for supplying power to said auxiliary equipment utilizing power produced by said first generator, the power generation plant further comprising:

a motor electrically connected to said starter device;

an emergency generator connected to said motor; and a control unit which executes switching control of said disconnecting switch in response to an output voltage of said in-station power supply unit, whereby power is obtained from said first generator utilizing inertial rotational energy of said turbine, said power obtained from said first generator is supplied to said motor via said starter device for driving said motor, and said emergency generator is started.

2. A power generation plant according to claim 1 which further includes an auxiliary power source for supplying power when said power obtained from said first generator drops below a predetermined level.

3. A power generation plant according to claim 2 wherein said auxiliary power source comprises a fuel cell.

4. In a power generation plant having a turbine, a first generator coupled to a rotor shaft of said turbine, a starter device connected to said first generator via a disconnecting switch for outputting power by converting the frequency of an input electric power, auxiliary equipment for assisting operation of said turbine, and an in-station power supply unit for supplying power to said auxiliary equipment utilizing power produced by said first generator, the power generation plant further comprising:

a motor electrically connected to said starter device;

an emergency generator connected to said motor; and a control unit which controls said disconnecting switch to close when an output voltage from said in-station power supply unit drops to a predetermined value, whereby power is obtained from said first generator utilizing inertial rotation energy of said turbine, said power obtained from said first generator is supplied to said motor via said starter device for driving said motor, and said emergency generator is started.

5. A power generation plant according to claim 4 which further includes an auxiliary power source for supplying power when said power obtained from said first generator drops below a predetermined level, a second motor electrically connected to said auxiliary power source and a clutch for mechanically connecting and disconnecting said motor electrically connected to said starter device and said second motor.

6. A power generation plant according to claim 5 wherein said auxiliary power source is a fuel cell.

7. A power generation plant according to claim 5 wherein said motor electrically connected to said starter is an AC motor and said second motor is a DC motor.

8. In a power generation plant having a turbine, a first generator coupled to a rotor shaft of said turbine, and a starter device connected to said first generator via a disconnecting switch for outputting power by converting the frequency of an input electric power, auxiliary equipment for assisting operation of said turbine, and an in-station power supply unit for supplying power to said auxiliary equipment utilizing power produced by said first generator, the power generation plant further comprising:

a motor electrically connected to said starter device;

an emergency generator connected to said motor;

a low voltage relay which detects abnormality in said in-station power supply unit; and a control unit which controls said disconnecting switch to close on the basis of an actuation signal from said low voltage relay, whereby power is obtained from said first generator utilizing inertial rotational energy of said turbine, said power obtained from said first generator is supplied to said motor via said starter device for driving said motor, and said emergency generator is started.

9. In a power generation plant having a turbine, a first generator coupled to a rotor shaft of said turbine, and a starter device connected to said first generator via a disconnecting switch for outputting power by converting the frequency of an input electric power, auxiliary equipment for assisting operation of said turbine, and an in-station power supply unit for supplying power to said auxiliary equipment utilizing power produced by said first generator, the power generation plant further comprising:

a motor electrically connected to said starter device;

an emergency generator connected to said motor; and a control unit which causes said disconnecting switch to close when an output voltage of said in-station power supply unit drops below a predetermined value, whereby power is obtained by means of said first generator by utilizing inertial rotational energy of said turbine when said auxiliary equipment stops operation due to dropping below the predetermined value of the output voltage of said in-station power supply unit, said power obtained by means of said first generator is supplied to said motor via said starter device for driving said motor, and operation of said emergency generator is started.

10. A power generation plant according to claim 9, which further includes means for supplying the electric power generated by said emergency generator to said auxiliary equipment.

11. A power generation plant according to claim 9, which further includes means for supplying the electric power generated by said emergency generator to said auxiliary equipment via said in-station power supply unit.

* * * * *